(12) United States Patent
Lepine et al.

(10) Patent No.: US 9,969,136 B2
(45) Date of Patent: May 15, 2018

(54) INFLATABLE POUCHES

(71) Applicant: Sealed Air Corporation (US), Duncan, SC (US)

(72) Inventors: Jay D. Lepine, Dedham, MA (US); Brian A. Murch, Needham, MA (US); Laurence B. Sperry, Newton, MA (US)

(73) Assignee: Sealed Air Corporation (US), Charlotte, NC (US)

( * ) Notice: Subject to any disclaimer, the term of this patent is extended or adjusted under 35 U.S.C. 154(b) by 972 days.

(21) Appl. No.: 13/866,080

(22) Filed: Apr. 19, 2013

(65) Prior Publication Data

US 2014/0314978 A1    Oct. 23, 2014

(51) Int. Cl.
| | | |
|---|---|---|
| *B31D 5/00* | (2017.01) | |
| *B65B 9/08* | (2012.01) | |
| *B29D 22/02* | (2006.01) | |
| *B65D 81/03* | (2006.01) | |
| *B65B 55/20* | (2006.01) | |

(52) U.S. Cl.
CPC .......... *B29D 22/02* (2013.01); *B31D 5/0073* (2013.01); *B65B 55/20* (2013.01); *B65D 81/03* (2013.01); *B31B 2221/05* (2013.01); *B31D 2205/0017* (2013.01); *B31D 2205/0082* (2013.01); *Y10T 428/1334* (2015.01)

(58) Field of Classification Search
CPC ............................ B31D 5/0039; B31D 5/0073
USPC ............. 53/79, 568, 403, 472, 139.5; 383/3; 206/522
See application file for complete search history.

(56) References Cited

U.S. PATENT DOCUMENTS

| | | | |
|---|---|---|---|
| 4,011,798 A | 3/1977 | Bambara et al. | |
| 4,314,865 A | 2/1982 | Ottaviano | |
| 5,376,219 A | 12/1994 | Sperry et al. | |
| 5,454,642 A * | 10/1995 | De Luca | B65D 81/052 206/522 |
| 5,942,076 A | 8/1999 | Salerno et al. | |
| 6,003,288 A | 12/1999 | Sperry et al. | |
| 6,598,373 B2 * | 7/2003 | Sperry | B31D 5/0073 53/403 |
| 6,800,162 B2 | 10/2004 | Kannankeril et al. | |
| 6,982,113 B2 | 1/2006 | Kannankeril et al. | |
| 7,018,495 B2 | 3/2006 | Kannankeril et al. | |
| 7,128,211 B2 | 10/2006 | Nishi et al. | |

(Continued)

FOREIGN PATENT DOCUMENTS

| | | |
|---|---|---|
| CA | 2837508 A1 | 2/2013 |
| JP | H07285581 A | 10/1995 |
| JP | 2010275018 A | 12/2010 |
| WO | 2010/109727 | 9/2010 |

OTHER PUBLICATIONS

Notice of Rejection, dated Dec. 19, 2017, in corresponding Japanese patent application No. 2016-509126.

*Primary Examiner* — Andrew M Tecco
*Assistant Examiner* — Praachi M Pathak
(74) *Attorney, Agent, or Firm* — Jon M. Isaacson

(57) ABSTRACT

A supply of inflatable pouches includes an inflatable web defining a series of inflatable chambers, a longitudinal fold in the web such that the web is configured in the form of two juxtaposed inflatable panels joined together at the longitudinal fold, and a series of transverse seals that bond the panels together to form a series of inflatable pouches between pairs of the transverse seals.

12 Claims, 14 Drawing Sheets

(56) References Cited

U.S. PATENT DOCUMENTS

| | | | |
|---|---|---|---|
| 7,165,375 B2 | 1/2007 | O'Dowd | |
| 7,220,476 B2 | 5/2007 | Sperry et al. | |
| 7,223,461 B2 | 5/2007 | Kannankeril et al. | |
| 7,297,387 B2 | 11/2007 | Koyanagi | |
| 7,389,626 B2 | 6/2008 | Sperry et al. | |
| 7,429,304 B2 | 9/2008 | McNamara, Jr. et al. | |
| 7,552,571 B2 | 6/2009 | Lerner et al. | |
| 7,621,104 B2 * | 11/2009 | Piucci | B31B 37/00 53/403 |
| 7,721,781 B2 | 5/2010 | Sperry et al. | |
| 8,356,463 B2 | 1/2013 | Salerno et al. | |
| 2002/0166788 A1 * | 11/2002 | Sperry | B65D 81/03 206/522 |
| 2003/0094395 A1 | 5/2003 | Peper et al. | |
| 2004/0000581 A1 | 1/2004 | Brandolini et al. | |
| 2004/0022457 A1 | 2/2004 | Brown et al. | |
| 2006/0090845 A1 | 5/2006 | Shimowaki et al. | |
| 2008/0175522 A1 * | 7/2008 | Chuang | B65D 81/03 383/200 |
| 2010/0251665 A1 | 10/2010 | Sperry | |
| 2010/0251668 A1 | 10/2010 | Sperry et al. | |
| 2012/0072016 A1 | 3/2012 | Sperry et al. | |
| 2012/0273602 A1 | 11/2012 | Sperry et al. | |
| 2013/0089279 A1 * | 4/2013 | Liao | B65D 81/03 383/105 |
| 2014/0130461 A1 * | 5/2014 | Johan | B31D 5/0073 53/468 |
| 2014/0260094 A1 * | 9/2014 | Wehrmann | B65B 55/00 53/403 |

* cited by examiner

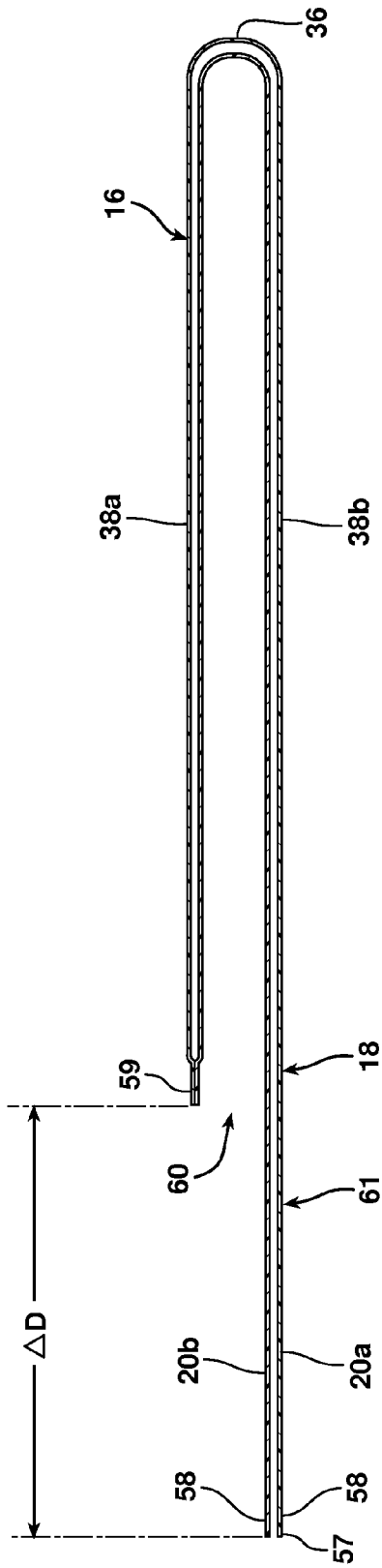

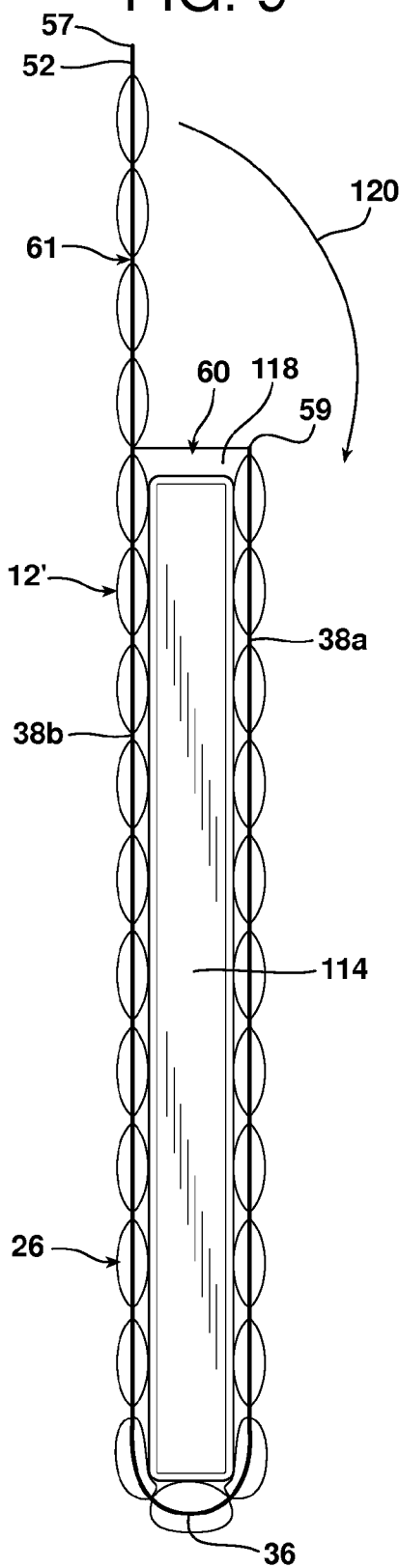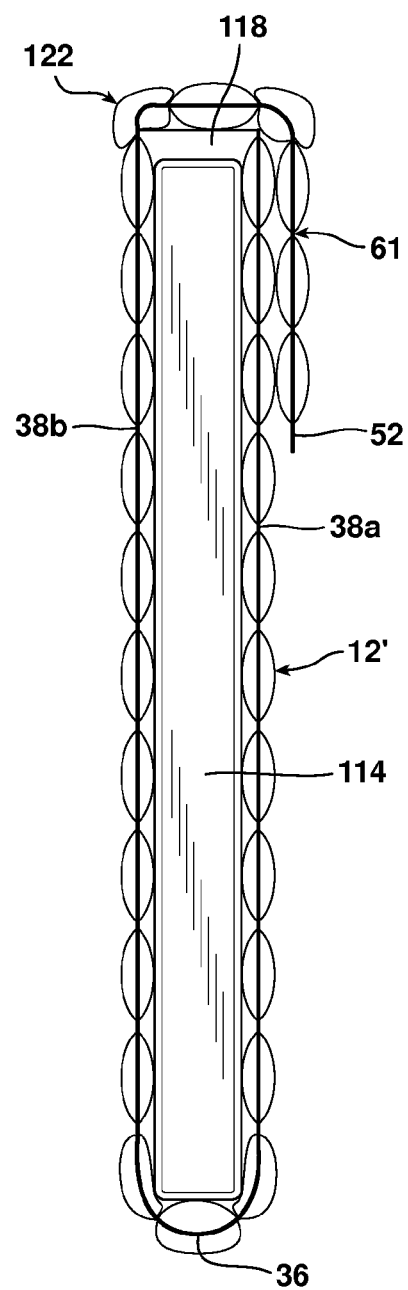

INFLATABLE POUCHES

BACKGROUND OF THE INVENTION

The invention relates generally to inflatable pouches used to package objects and, more particularly, to inflatable pouches that are adapted to be converted into a continuous series of inflated pouches.

Consumers frequently purchase goods from mail-order or internet retailers, which package and ship the goods to the purchasing consumer via the U.S. Postal Service or other carrier. Millions of such packages are shipped each Day.

Many of these packages include items such as pharmaceuticals, books, medical supplies, electronic devices, and the like. These items are normally packaged in small containers, such as a box or envelope. To protect the items during shipment, they are typically packaged with some form of protective dunnage that may be wrapped around the item or stuffed into the container to prevent movement of the item and to protect it from shock.

A common type of packaging envelope is known as a 'padded mailer.' Padded mailers are generally shipping envelopes that have padded walls to protect the contents of the mailer. Padded mailers generally include a single or double wall envelope, with paper dunnage or air cellular cushioning material to protect the packaged object. While such padded mailers have been commercially successful, they are not without drawbacks. For instance, because trapped or confined air is generally the cushioning medium, the space required to store such mailers is not insignificant. Further, in order not to require an inordinately large amount of storage space, the padded mailers are typically limited to having relatively thin padding.

One solution to the foregoing drawbacks is to employ inflatable mailers, i.e., mailers that have an integral inflatable cushioning material, which can be inflated just prior to packaging and shipment. While this approach has the potential to solve the above-described problems, current inflatable mailers require specialized inflation and sealing equipment, which is slow and cumbersome to operate, and which produces only one inflated mailer at a time.

Accordingly, there remains a need in the art for improvements in inflatable mailers, which overcome the foregoing difficulties.

SUMMARY OF THE INVENTION

That need is met by the present invention, which, in one aspect, provides a system for making inflated pouches, which may be used as inflatable mailers, comprising:
  a. a supply of inflatable pouches, the supply comprising:
  (1) an inflatable web, the web comprising two sheets having inner surfaces sealed to each other in a pattern defining a series of inflatable chambers having a closed distal end and an open proximal end, the open proximal end providing an inflation port for each of the chambers, the chambers arrayed in a substantially transverse orientation to a longitudinal dimension of the web,
  (2) a longitudinal fold in the web, which extends along the longitudinal dimension thereof such that the web is configured in the form of two juxtaposed inflatable panels joined together at the longitudinal fold, and
  (3) a series of transverse seals that bond the panels together to form a connected series of inflatable pouches between pairs of the transverse seals such that the connected series of inflatable pouches extends along the longitudinal dimension of the web;

b. an inflation assembly for introducing gas into the inflatable chambers via the inflation ports to thereby inflate the juxtaposed inflatable panels of the inflatable pouches so as to form inflated pouches; and
  c. a sealing mechanism for sealing the inflation ports to enclose the gas within the chambers of the inflated pouches.

Another aspect of the invention pertains to a method for making inflated pouches, comprising:
  a. providing a supply of inflatable pouches, the supply comprising:
  (1) an inflatable web, the web comprising two sheets having inner surfaces sealed to each other in a pattern defining a series of inflatable chambers having a closed distal end and an open proximal end, the open proximal end providing an inflation port for each of the chambers, the chambers arrayed in a substantially transverse orientation to a longitudinal dimension of the web,
  (2) a longitudinal fold in the web, which extends along the longitudinal dimension thereof such that the web is configured in the form of two juxtaposed inflatable panels joined together at the longitudinal fold, and
  (3) a series of transverse seals that bond the panels together to form a connected series of inflatable pouches between pairs of the transverse seals such that the connected series of inflatable pouches extends along the longitudinal dimension of the web;
  b. introducing gas into the inflatable chambers via the inflation ports, thereby inflating the juxtaposed panels so as to form inflated pouches; and
  c. sealing the inflation ports to enclose the gas within the chambers of the inflated pouches.

A further aspect of the invention is directed to a method for making inflatable pouches, comprising:
  a. providing an inflatable web, the web comprising two sheets having inner surfaces sealed to each other in a pattern defining a series of inflatable chambers having a closed distal end and an open proximal end, the open proximal end providing an inflation port for each of the chambers, the chambers arrayed in a substantially transverse orientation to a longitudinal dimension of the web;
  b. folding the web along the longitudinal dimension thereof to form a longitudinal fold therein to thereby configure the web in the form of two juxtaposed inflatable panels joined together at the longitudinal fold; and
  c. producing a series of transverse seals that bond the panels together to form a connected series of inflatable pouches between pairs of the transverse seals such that the connected series of inflatable pouches extends along the longitudinal dimension of the web,
  whereby, the pouches may be inflated via the inflation ports.

An additional aspect of the invention pertains to a supply of inflatable pouches, comprising:
  a. an inflatable web, the web comprising two sheets having inner surfaces sealed to each other in a pattern defining a series of inflatable chambers having a closed distal end and an open proximal end, the open proximal end providing an inflation port for each of the chambers, the chambers arrayed in a substantially transverse orientation to a longitudinal dimension of the web;
  b. a longitudinal fold in the web, which extends along the longitudinal dimension thereof such that the web is configured in the form of two juxtaposed inflatable panels joined together at the longitudinal fold; and
  c. a series of transverse seals that bond the panels together to form a connected series of inflatable pouches between pairs of the transverse seals such that the connected series of inflatable pouches extends along the longitudinal dimension of the web, whereby, the pouches may be inflated via the inflation ports.

A further aspect of the invention is directed towards a method for making inflated pouches, comprising:

a. providing an inflatable web, the web comprising two sheets having inner surfaces sealed to each other in a pattern defining a series of inflatable chambers having a closed distal end and an open proximal end, the open proximal end providing an inflation port for each of the chambers, the chambers arrayed in a substantially transverse orientation to a longitudinal dimension of the web;

b. folding the web along the longitudinal dimension thereof to form a longitudinal fold therein to thereby configure the web in the form of two juxtaposed panels joined together at the longitudinal fold;

c. introducing gas into the inflatable chambers via the inflation ports;

d. sealing the inflation ports to enclose the gas within the chambers; and e. producing a series of transverse seals that bond the panels together to form a series of inflated pouches between pairs of the transverse seals.

These and other aspects and features of the invention may be better understood with reference to the following description and accompanying drawings.

BRIEF DESCRIPTION OF THE DRAWING

FIG. 3A is a cross-sectional view taken along line 3A-3A in FIG. 3;

FIGS. 9-10 are elevational, cross-sectional views of the package made in accordance with FIG. 8;

DETAILED DESCRIPTION OF THE INVENTION

Figure 1:
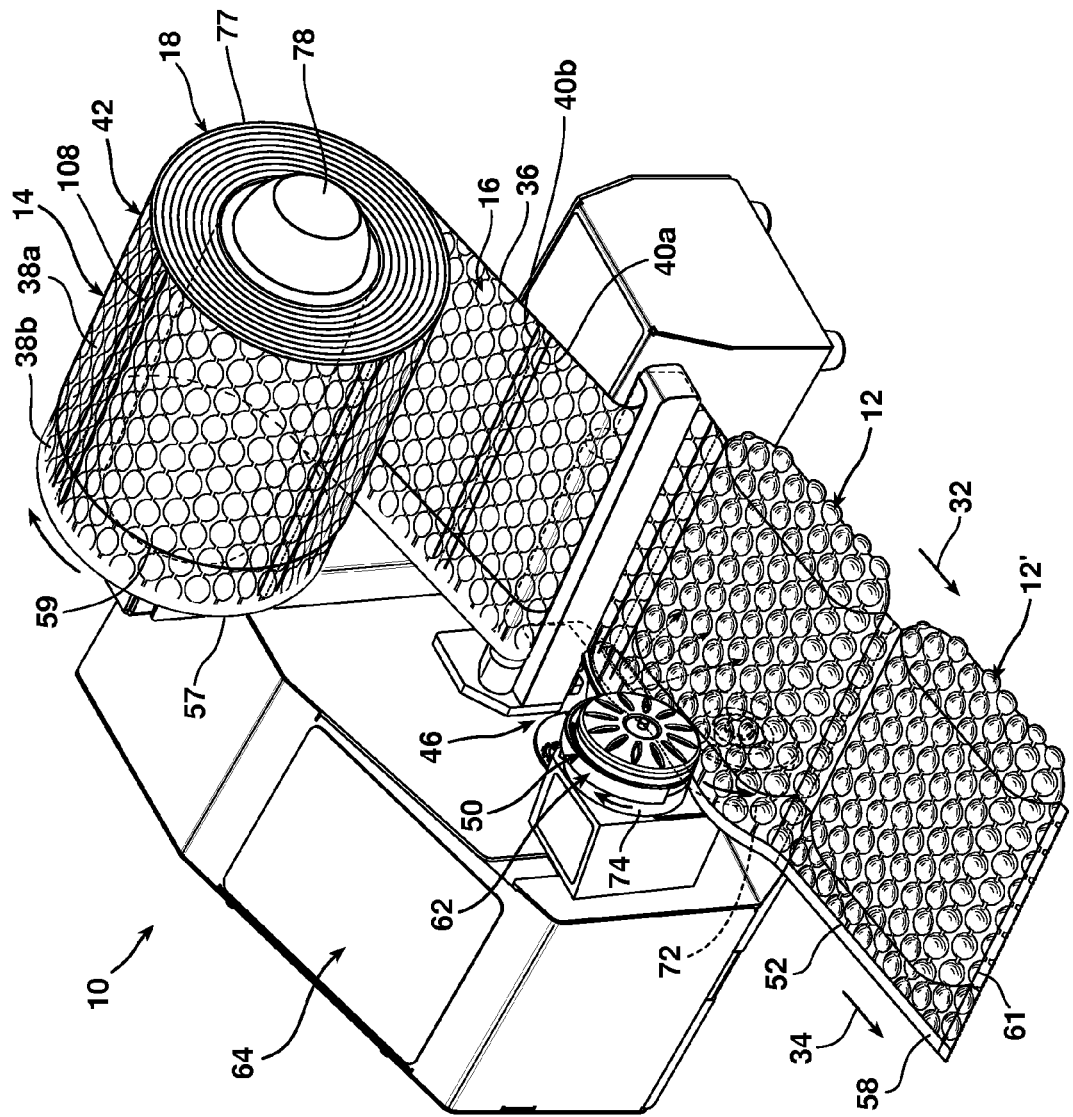
FIG. 1 is a perspective view of a system and method in accordance with the present invention for making inflated pouches.
Figure 2:
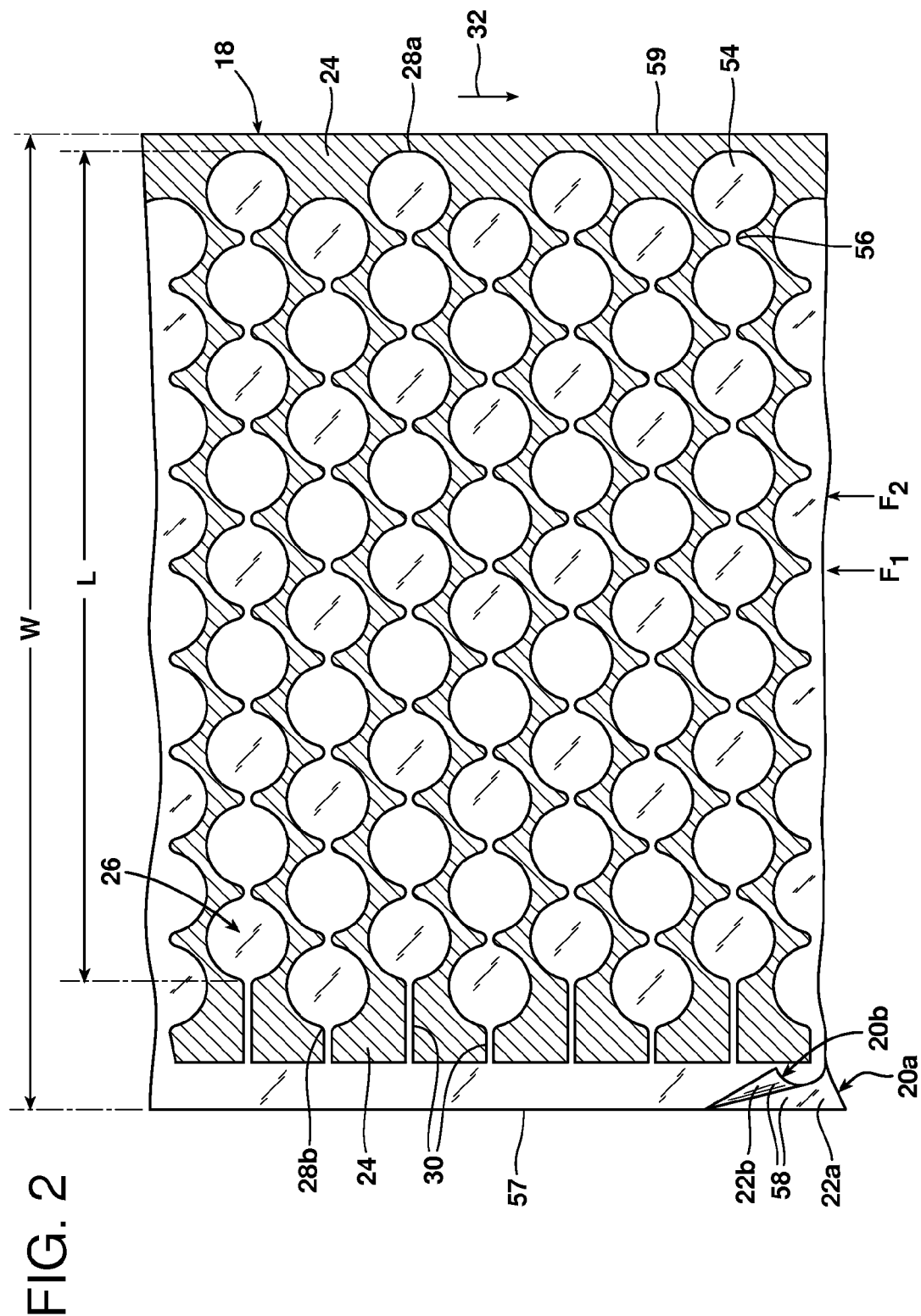
FIG. 2 is a plan view of an inflatable web used to make inflated pouches in the system shown in FIG. 1.
Figure 3:
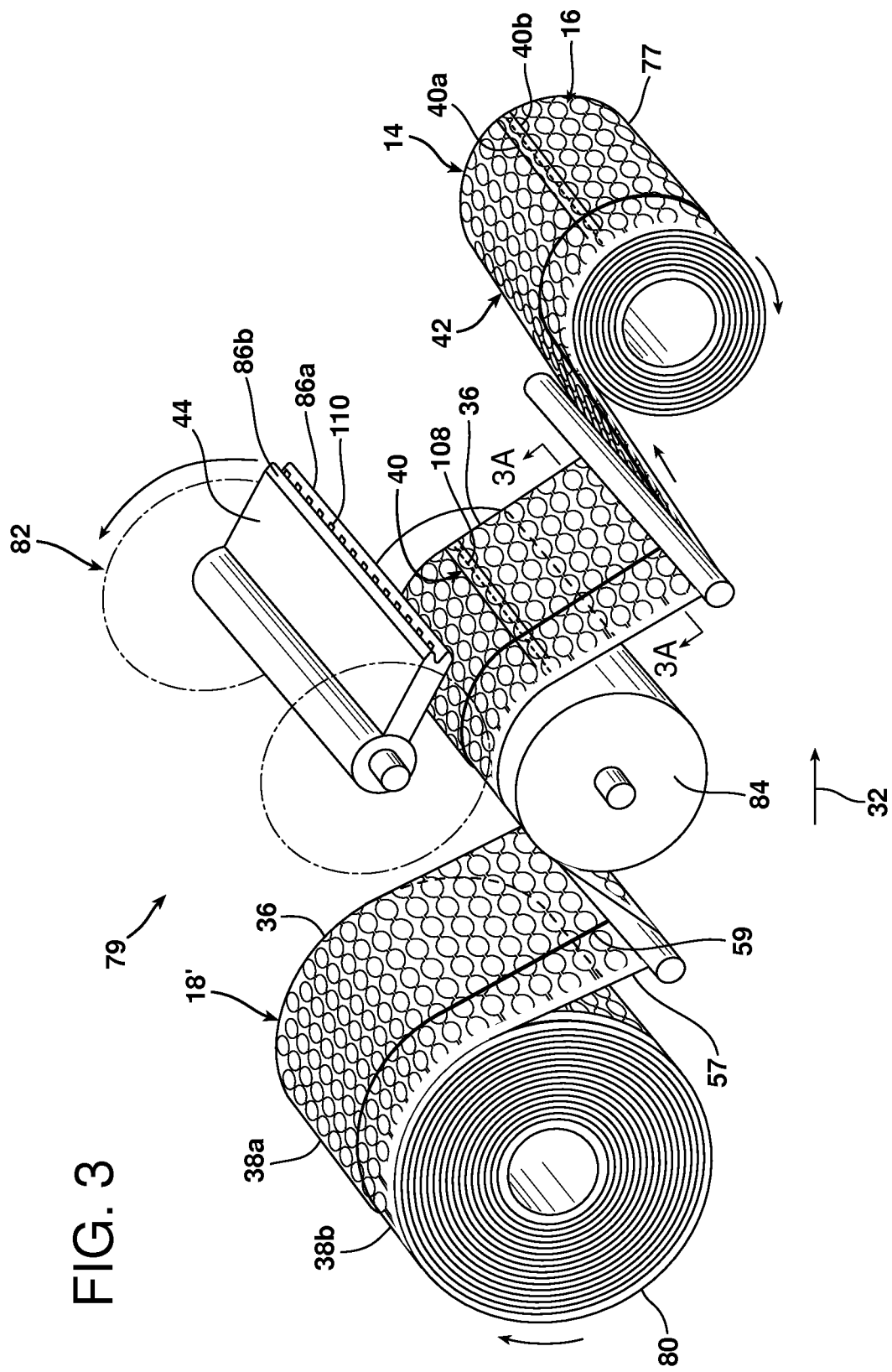
FIG. 3 is a perspective view of a system and method for making inflatable pouches as used in the system shown in FIG. 1, from the inflatable web shown in FIG. 2.

Referring to FIGS. 1-3, a system 10 for making inflated pouches 12 will be described. The inflated pouches 12 may be employed as inflatable mailers or in other packaging applications. System 10 includes a supply 14 of inflatable pouches 16. As perhaps best shown in FIG. 2, supply 14 includes an inflatable web 18, which comprises two sheets 20a, b having respective inner surfaces 22a, b sealed to each other in a seal pattern 24 defining a series of inflatable chambers 26 having a closed distal end 28a and an open proximal end 28b, with the open proximal ends 28b providing an inflation port 30 for each of the inflatable chambers 26. The inflatable chambers 26 are generally arrayed in a substantially transverse orientation to a longitudinal dimension 32 of the inflatable web 18. The longitudinal dimension 32 of web 18 is the longest dimension of the web (i.e., the length-wise dimension), and is generally parallel to the direction 34 in which the supply 14 of inflatable pouches 16 travels through system 10 (FIG. 1).

Supply 14 further includes a longitudinal fold 36 in web 18, which extends along longitudinal dimension 32 thereof (FIGS. 1, 3 and 3A). In this manner, web 18 is configured in the form of two juxtaposed inflatable panels 38a, b joined together at longitudinal fold 36.

Supply 14 also includes a series of transverse seals 40 that bond the juxtaposed panels 38a, b together to form a connected series 42 of the inflatable pouches 16 between pairs 40a, b of the transverse seals. Each of the pouches 16 thus have side edges that are defined by a pair of transverse seals 40a, b, front and back walls that are provided by the juxtaposed inflatable panels 38a, b, a bottom as provided by the longitudinal fold 36, and an open top provided by the opposing longitudinal edges (57 and 59) of inflatable web 18, as described in further detail below.

As shown in FIG. 3, the transverse seals 40 may be applied to longitudinally-folded web 18 by a transverse seal mechanism 44, which may create transverse seal-pairs 40a, b simultaneously as shown. In this fashion, the connected series 42 of inflatable pouches 16 extends along the longitudinal dimension 32 of inflatable web 18.

Figure 4:
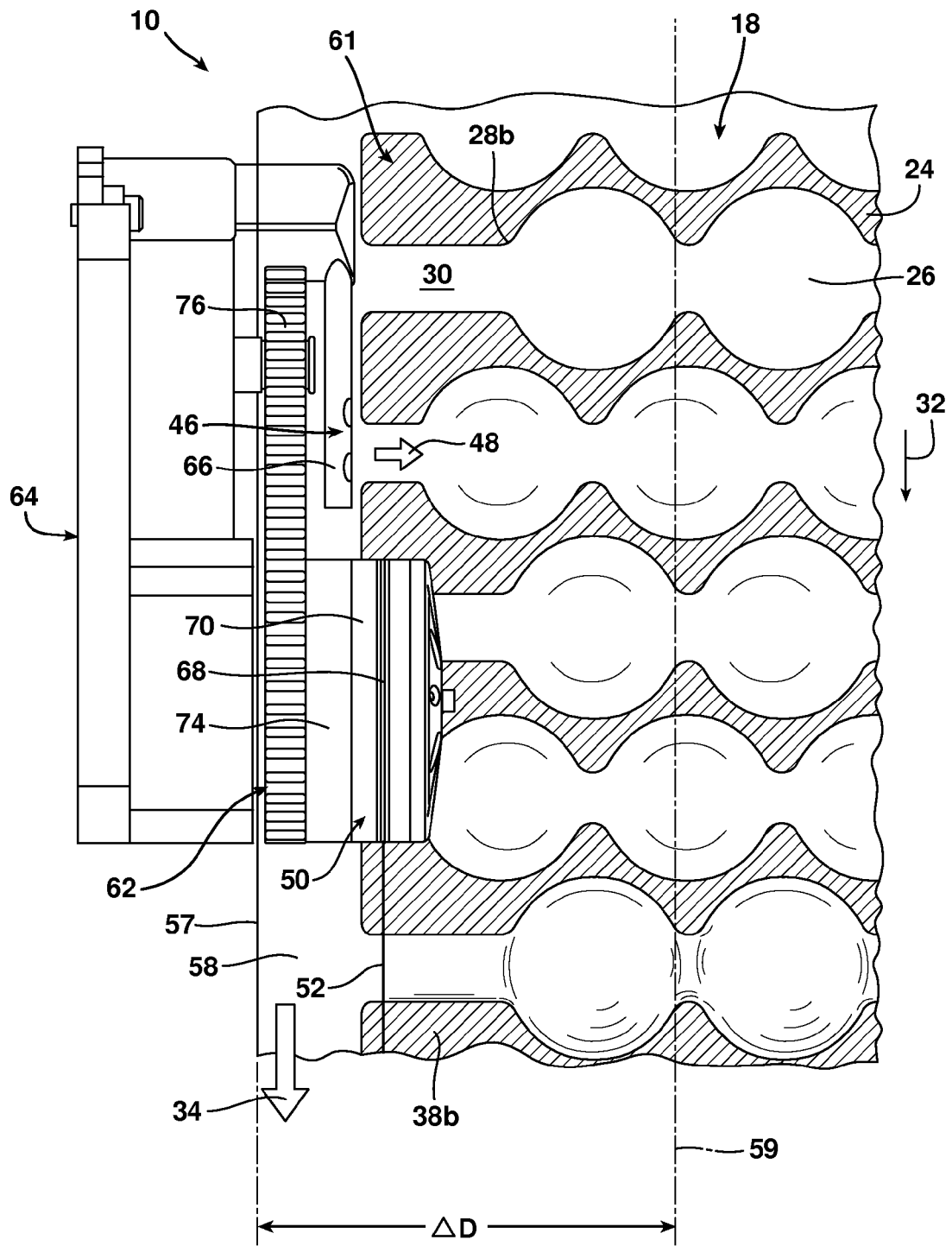
FIG. 4 is a plan view of the inflation and longitudinal sealing portions of the system shown in FIG. 1.

Referring to FIGS. 1 and 4, it may be seen that system 10 further includes an inflation assembly 46 for introducing gas 48 into the inflatable chambers 26 via inflation ports 30, to thereby inflate the juxtaposed inflatable panels 38a, b of the inflatable pouches 16 so as to form inflated pouches 12 (note that in FIG. 4, the 'upper' inflatable panel 38a has been omitted for clarity, with only closed longitudinal edge 59 thereof shown in phantom). A sealing mechanism 50 is also included for sealing the inflation ports 30, e.g., with a heat seal 52, so as to enclose the gas 48 within the chambers 26 of the inflated pouches 12. A fully completed inflated pouch, i.e., with chambers 26 inflated and sealed closed via heat seal 52, is indicated at 12' in FIG. 1.

Inflatable chambers 26 in web 18 may have any desired configuration, e.g., a linear tube-shaped configuration, as shown in FIG. 10. Alternatively, the inflatable chambers 26 may, as shown in FIGS. 1-4, have a variable shape, e.g., wherein each of the chambers 26 has a predetermined length "L" (FIG. 2) and at least one change in width over their length. Thus, for example, as shown perhaps most clearly in FIG. 2, seal pattern 24 may be such that each chamber 26 contains a series of sections 54 of relatively large width connected by relatively narrow passageways 56. When inflated, sections 54 may provide substantially spherical bubbles in web 18 by symmetrical outward movement of those sections of sheets 20a, b comprising the walls of sections 54. This will generally occur when sheets 20a, b are identical in thickness, flexibility, and elasticity. Sheets 20a, b may, however, be of different thickness, flexibility or elasticity, and/or seal pattern 24 may be configured, such that inflation will result in different displacement of sheets 20a, b, thereby providing, e.g., hemispherical or asymmetrical bubbles. The former embodiment may be accomplished by providing sheets 20a, b from a single film web that is folded upon itself in a juxtaposed relationship, e.g., center-folded, prior to having seal pattern 24 applied thereto, while the latter embodiment may be accomplished by providing sheets 20a, b from two separate film webs that are merged together in a juxtaposed relationship prior to applying seal pattern 24 thereto.

Length L may be substantially the same for each of the chambers 26, with adjacent chambers being off-set from one another as shown in order to arrange the chambers in close proximity to one another. As also shown, length L of each chamber 26 is generally oriented transversely to the longitudinal dimension 32 of web 18.

With continuing reference to FIG. 2, it may be seen that the inflatable web 18 may include a longitudinal inflation edge 57 and an opposing, closed longitudinal edge 59. Inflation ports 30 for each of the inflatable chambers 26 are positioned in series along the inflation edge 57, while the distal ends 28a of the chambers are positioned in series along the closed edge 59.

The inflatable web 18 may further includes a pair of longitudinal flanges 58, which are formed by a portion of each of the sheets 20a, b that extend beyond the inflation ports 30 and seal pattern 24 (which is longitudinally intermittent at the inflation ports to define the same) in such a manner as to define the inflation edge 57. The flanges 58 are not sealed together, and thus form an open inflation zone in web 18. In the embodiment shown in FIG. 2, flanges 58 extend out equally beyond inflation ports 30 and seals 24. In many embodiments, inflation will be effected by bringing the inner surfaces of flanges 58 into close slidable contact with outwardly facing surfaces of an appropriately configured nozzle or other inflation means so as to provide a partially closed inflation zone which provides sequential inflation of chambers 26 without restricting the movement of the web or inflation nozzle, thereby allowing such sequential inflation to occur. The flanges 58 may have different widths, but will generally be equal in width, as shown in FIG. 2.

Sheets 20a, b may, in general, comprise any flexible material that can be manipulated and sealed to enclose gas 48 in chambers 26 as herein described, including various thermoplastic materials, e.g., polyethylene homopolymer or copolymer, polypropylene homopolymer or copolymer, etc. Non-limiting examples of suitable thermoplastic polymers include polyethylene homopolymers, such as low density polyethylene (LDPE) and high density polyethylene (HOPE), and polyethylene copolymers such as, e.g., ionomers, EVA, EMA, heterogeneous (Zeigler-Netto catalyzed) ethylene/alpha-olefin copolymers, and homogeneous (metallocene, single-cite catalyzed) ethylene/alpha-olefin copolymers. Ethylene/alpha-olefin copolymers are copolymers of ethylene with one or more comonomers selected from $C_3$ to $C_{20}$ alpha-olefins, such as 1-butene, 1-pentene, 1-hexene, 1-octene, methyl pentene and the like, in which the polymer molecules comprise long chains with relatively few side chain branches, including linear low density polyethylene (LLOPE), linear medium density polyethylene (LMDPE), very low density polyethylene (VLDPE), and ultra-low density polyethylene (ULDPE). Various other materials are also suitable such as, e.g., polypropylene homopolymer or polypropylene copolymer (e.g., propylene/ethylene copolymer), polyesters, polystyrenes, polyamides, polycarbonates, etc. The film may be monolayer or multilayer and can be made by any known coextrusion process by melting the component polymer(s) and extruding or coextruding them through one or more flat or annular dies.

Further details concerning inflatable web 18 and the manner of making it are disclosed in U.S. Pat. Nos. 7,220, 476, 7,721,781, 6,800,162, 6,982,113, 7,223,461, and 7,018, 495, the disclosures of which are hereby incorporated herein by reference thereto.

Longitudinal fold 36 may be made at any desired location along the width "W" of inflatable web 18 (FIG. 2), the effect of which is to bring longitudinal edges 57, 59 closer together in the folded configuration (FIG. 3A) than in the lay-flat/non-folded configuration (FIG. 2). Another effect of longitudinal fold 36, along with transverse seals 40a, b, is to convert inflatable web 18 into a series of inflatable pouches 16, wherein each pouch 16 has an open top 60, as formed by the resultant adjacently-positioned and (at least initially) unsealed longitudinal edges 57, 59 (FIG. 3A). The open top 60 allows objects to be packaged to be placed inside of the pouches (FIGS. 8-11) or, alternatively, allows the pouches to be placed over a portion of an object to be packaged (FIG. 12).

Longitudinal fold 36 can be made at any desired location across the width "W" of inflatable web 18 (FIG. 2), i.e., the width of web 18 as defined between the inflation and closed longitudinal edges 57, 59. For example, the longitudinal fold could be made at location $F_1$, which is at the center of the width W of web 18. In this instance, web 18 will be 'center-folded' such that the longitudinal inflation edge 57 extends from the longitudinal fold 36 by substantially the same distance as does the closed longitudinal edge 59. The juxtaposed inflatable panels 38a, b will thus have essentially the same dimensions and therefore be fully juxtaposed, with the longitudinal edges 57, 59 being aligned together in coextensive opposition to longitudinal fold 36.

Alternatively, longitudinal fold 36 in inflatable web 18 may be off-center relative to width W of web 18, e.g., made at location $F_2$, which is to the right of the center location $F_1$ (FIG. 2), so that inflation edge 57 is off-set from closed edge 59 (FIGS. 1, 3, and 3A) in the supply 14 of inflatable pouches 16. As perhaps best shown in FIG. 3A, in this embodiment, the inflation edge 57 extends from longitudinal fold 36 by a greater distance "ΔD" than does the closed edge 59, with such greater distance ΔD providing an extended region 61, which corresponds to the off-set between the inflation edge 57 and closed edge 59. Alternatively, location $F_2$ could be made to the left of the center location $F_1$ (FIG. 2), so that closed edge 59 extends from longitudinal fold 36 by a greater distance "ΔD" than the inflation edge 57.

An advantage of the 'off-set' configuration for web 18 (FIG. 3A) is that this allows the resultant supply 14 of inflatable pouches 16 to be inflated and sealed on conventional inflation and sealing machines. No specialized inflation and sealing equipment is needed. For example, like many conventional inflation and sealing systems, system 10 includes a conveyance mechanism 62 for conveying the supply 14 of inflatable pouches 16 through the system by engaging the extended region 61 at longitudinal inflation edge 57. The inflation assembly 46 and sealing mechanism 50 similarly engage the extended region 61 at inflation edge 57 to effect inflation and sealing, respectively, of the inflatable pouches 16. Conventional inflation and sealing machines generally operate via engagement of the inflation edge of the inflatable web because it allows for a variety of web-widths to be employed on the same machine without the need for adjustment, as only the distance W between the inflation edge and non-engaged closed edge is affected.

In accordance with the 'off-set' embodiment of the present invention, even though the web has been longitudinally folded to form pouches, the extended region 61 allows for engagement of inflation edge 57 only, i.e., to the exclusion of the closed edge 59 (see, e.g., FIGS. 1 and 4), so that the closed edge 59 does not interfere with conveyance, inflation, and sealing. Advantageously, this allows for continuous conveyance, inflation, and sealing, i.e., as opposed to intermittent conveyance, inflation, and sealing, on a conventional machine, such as, e.g., the NewAir I.B.® Express Packaging System, which is sold commercially by Sealed Air Corporation. Continuous conveyance, inflation, and sealing is generally faster and more productive/cost-effective than intermittent conveyance, inflation, and sealing, and the ability to employ conventional, 'continuous-conveyance' machines, without the need for modifications or specialized machines, further adds to the cost-effectiveness of the 'off-set' embodiment of the present invention.

Accordingly, conveyance mechanism 62 generally effects conveyance of supply 14 of inflatable pouches 16 in direction 34 as shown, which is parallel to longitudinal dimension 32 of web 18. Such conveyance is preferably effected in a substantially continuous, e.g., non-intermittent, manner. When system 10 is operated in this manner, inflation assembly 46 introduces gas 48 into inflatable chambers 26 substantially continuously and sequentially via inflation ports 30. Such gas 48 sequentially travels the length L of each inflatable chamber 26, flowing first into the portion of each chamber disposed in inflatable panel 38b, then traversing the longitudinal fold 36 to flow into the portion of each chamber 26 disposed in inflatable panel 38a (FIG. 3A). Both of the juxtaposed panels 38a, b may thus be inflated in the same operation, i.e., in a continuous and sequential manner as the supply 14 is conveyed continuously longitudinally through system 10 by conveyance mechanism 62. Sealing mechanism 50 preferably seals the inflation ports 30 substantially continuously and sequentially as well.

In the illustrated embodiment for system 10 as shown in FIGS. 1 and 4, the inflation assembly 46, sealing mechanism 50, and conveyance mechanism 62 are integrated into an inflation and sealing machine 64 which, as noted above, may be embodied by the NewAir I.B.® Express Packaging System sold by Sealed Air Corporation, which is described in US Publication Nos. 2010-0251665 and 2010-0251668, the disclosures of which are hereby incorporated herein by reference thereto. As described in further detail in the foregoing publications, the inflation assembly 46 may include an inflation nozzle 66, which is adapted for insertion between the flanges 58 of web 18, in order to direct gas 48 into inflatable chambers 26 via ports 30. Sealing mechanism 50 may include a sealing element 68, e.g., an electrically-resistive element such as a wire or the like, disposed on a rotary sealing roller 70, with a backing roller 72 (FIG. 1) in compressive contact with the sealing roller 70, such that the web 18 may be compressed therebetween in order to bring the sealing element 68 into firm contact with the web to produce longitudinal seal 52, which is preferably a heat seal, across inflation ports 30.

Conveyance mechanism 62 may include a pair of counter-rotating drive rollers, e.g., driven roller 74 rotating against backing roller 72. Driven roller 74 may be coaxial with sealing roller 70, with both rotating against common backing roller 72 as shown. Conveyance mechanism 62 may further include a pair of counter-rotating drive belts 76 (only one shown in FIG. 4), which may be positioned to engage flanges 58 outboard of inflation nozzle 66, to assist in both the conveyance of web 18 and inflation of chambers 26 by driving the web through machine 64 and preventing gas 48 from leaking out of the web via open longitudinal edge 57, i.e., so that more of the gas is forced to flow from the nozzle 66 and into the chambers 26. As an alternative to drive belts 76, a plurality of engagement rollers, e.g., intermeshing gears, may be employed, e.g., as described and illustrated in the above-referenced US Publication No. 2010-0251668 (see also FIG. 5, discussed infra). As a further alternative, instead of engaging and conveying the web at the extended region 61, engagement and conveyance may occur elsewhere on the web, e.g., in between the open longitudinal edge 57 and the longitudinal fold 36.

Supply 14 of inflatable pouches 16 may also be inflated and sealed on other conventional inflation and sealing machines, such as those described in U.S. Pat. Nos. 7,220,476, 7,429,304, and 7,165,375, the disclosures of which are hereby incorporated herein by reference thereto.

In system 10 as illustrated in FIG. 1, supply 14 of inflatable pouches 16 is provided in the form of a roll 77, and is disposed on spool 78 on machine 64 for rotational dispensation of the supply 14 into machine 64. Other configurations are also possible, e.g., the supply 14 may be fan-folded or vertically-coiled and dispensed into machine 64 from a carton, such as a cardboard box.

FIG. 3 illustrates a process 79 for making inflatable pouches 16, in which web 18 has previously been folded along longitudinal dimension 32 thereof at location F2 (FIG. 2) to form longitudinal fold 36 therein, thereby configuring the web in the form of juxtaposed inflatable panels 38a, b, which are joined together at the longitudinal fold 36. The resultant folded web 18' may then be formed into an intermediate roll 80 for further processing, which includes producing a series of transverse seals 40. To this end, the folded web 18' may be withdrawn from intermediate roll 80 and directed into transverse sealing station 82, which includes transverse seal mechanism 44 and backing member 84. The transverse sealing station 82 may be embodied by a rotary sealing device, e.g., such as that disclosed in U.S. Pat. No. 7,389,626, the disclosure of which is hereby incorporated herein by reference thereto. The transverse seal mechanism 44 may thus include a pair of transverse sealing members 86a, b, which produce the pair 40a, b of transverse seals 40 each time the sealing members 86a, b are brought into contact with folded web 18', e.g., with each rotation of the rotary-type seal mechanism 44 as shown, in order to form the inflatable pouches 16 between such transverse seals.

As described in the above-incorporated '626 patent, the transverse seals 40 may be made at regular intervals as the folded web 18' is conveyed through the transverse sealing station 82, in which case the spacing between the transverse seals will be essentially the same, thereby producing inflatable pouches 16 of the same width dimension (distance between the transverse seals 40a, b of each pouch 16, which form the sides thereof) on supply roll 77. Alternatively, the transverse seals 40 may be made at irregular intervals on folded web 18', e.g., by varying the rate of conveyance of web 18' through transverse sealing station 82 and/or varying the rate of transverse seal formation by seal mechanism 44, in which case the resultant inflatable pouches 16 will have differing width dimensions on supply roll 77. As a further alternative, the frequency at which the transverse seal mechanism 44 makes transverse seals may be independent of the speed at which the web 18' is conveyed through the sealing station 82, and may be selectively controlled such that the width dimension of the pouches 16 may be varied on a real-time, e.g., on-the-fly, basis, as disclosed, e.g., in U.S.

Pat. No. 8,356,463, the disclosure of which is hereby incorporated herein by reference thereto. The frequency at which the transverse seals are made may be based, e.g., on the passage of a predetermined length of the web along longitudinal dimension 32, the passage of a predetermined number of inflatable chambers 26, etc.

After the formation of the transverse seals 40, the resultant supply 14 of inflatable pouches 16 may be formed into supply roll 77 as shown, e.g., for subsequent placement on spool 78 on machine 64 in order to inflate and seal the pouches in system 10, as illustrated in FIG. 1. Thus, while the operation illustrated in FIG. 3 may be performed at one location, e.g., a production factory, the operation illustrated in FIG. 1 may be performed at another location, e.g., at a packaging warehouse, with the supply rolls 77 being shipped to the packaging warehouse, in which they may be stored until needed for use in system 10 to produce completed inflated pouches 12'. In such embodiment, the inflatable pouches 16 as contained on supply roll 77 are 'pre-configured', in that only the final steps of inflation and sealing are performed in system 10.

In other embodiments of the invention, the longitudinal fold 36, transverse seals 40 and/or inflatable chambers 26 may be produced on, i.e., as a part of, the inflation and sealing system/process that results in inflated pouches 12/12'. For example, process 79 as shown in FIG. 3 may further include the steps of introducing gas into inflatable chambers 26 via inflation ports 30, thereby inflating the juxtaposed panels 38a, b so as to form inflated pouches 12, and sealing the inflation ports 30 to enclose the gas within the chambers 26, to thereby complete the conversion of inflatable pouches 16 into inflated pouches 12'. This may be accomplished, e.g., by combining process 79 (FIG. 3) with system/process 10 (FIG. 1), with the latter following the former and with, e.g., the supply 14 of inflatable pouches 16 being fed directly into inflation assembly 46 and sealing mechanism 50, i.e., instead of first being formed into supply roll 77.

Figure 5:
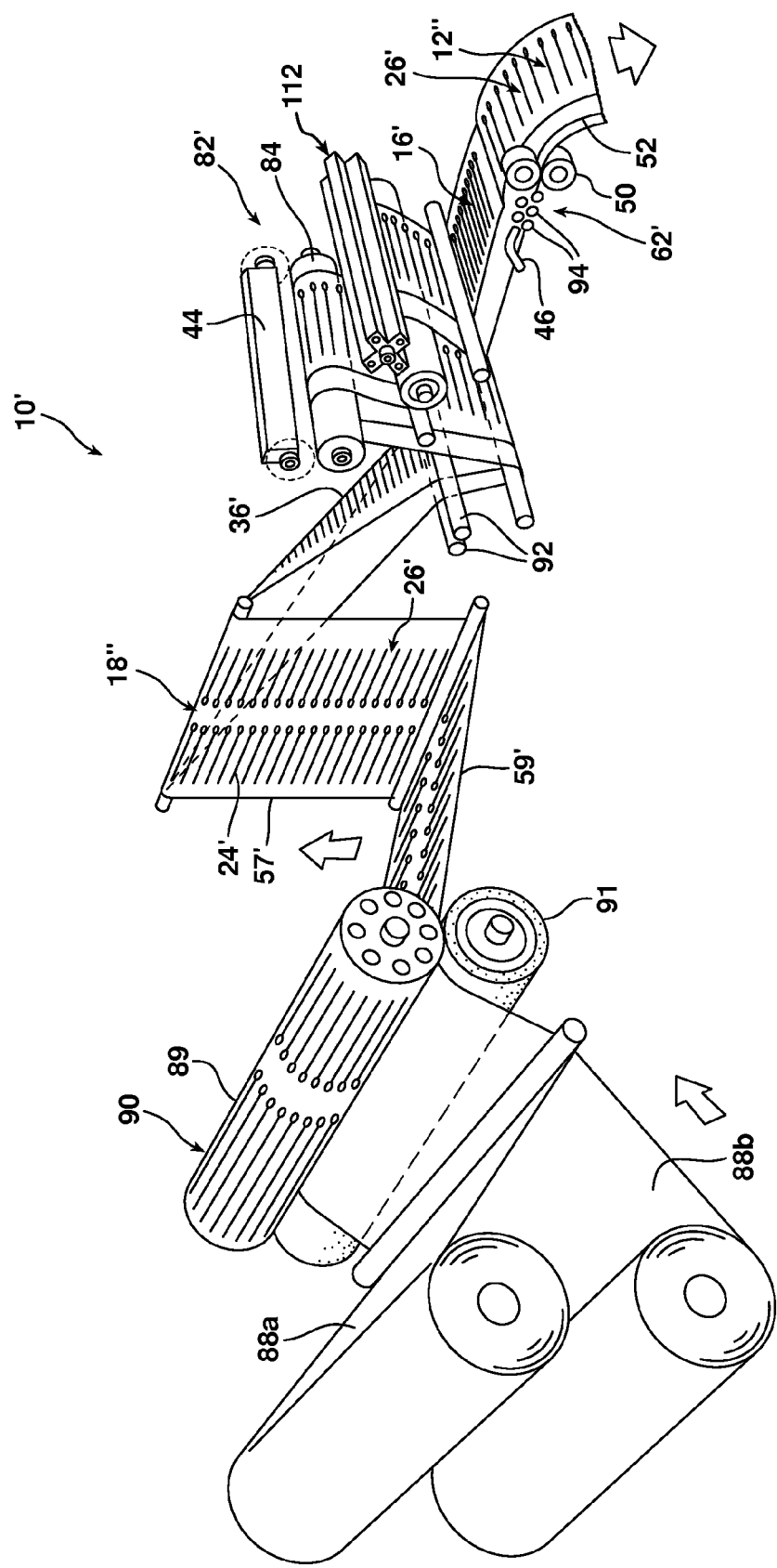
FIG. 5 is a perspective view of an alternative system and method for making inflated pouches in accordance with the present invention.

Similarly but alternatively, a system and process 10' are shown in FIG. 5, wherein two sheets 88a, b, in the form of continuous longitudinal webs, are converged into a juxtaposed relationship and fed into a rotary sealing mechanism 90. Sheets 88a, b may be provided from two separate sources, e.g., rolls, as shown, or via a single source, e.g., a center-folded web with two sheets joined at the c-fold. Sealing mechanism 90 includes a sealing roller 89 and a backing roller 91, and forms seal pattern 24', which results in a series of inflatable chambers 26'. Seal pattern 24' is an alternative to seal pattern 24, in that the former provide substantially linear, tube-shaped inflatable chambers 26', whereas the latter provides varying, connected bubble-shaped inflatable chambers 26. As will be described in further detail below, seal pattern 24' also provides inflatable pouches that are capable of being free-standing, i.e., once inflated and sealed.

After seal pattern 24' has been formed, the resultant inflatable web 18", which has a closed edge 59' and an inflation edge 57', is longitudinally folded via folding bars 92 to form longitudinal fold 36', and then transversely sealed in transverse sealing station 82' to form a series of inflatable pouches 16'. This supply of inflatable pouches 16' is then inflated via inflation assembly 46, followed by sealing closed the inflated chambers 26' via sealing mechanism 50, which forms longitudinal seal 52, to form inflated pouches 12". Conveyance mechanism 62' is similar to mechanism 62, except that an array of engagement rollers, e.g., intermeshing gears, are employed in conveyance mechanism 62', e.g., as described and illustrated in the above-referenced US Publication No. 2010-0251668, in place of the drive belts 76 used in conveyance mechanism 62.

Accordingly, it may now be appreciated that "providing" an inflatable web or a supply of inflatable pouches in accordance with the systems and methods of the present invention may range anywhere from (a) starting with a pre-configured inflatable web or preconfigured supply of inflatable pouches to (b) starting with two separate sheets, which are formed into an inflatable web, longitudinally folded, transversely sealed to form a series of inflatable pouches, inflated, then longitudinally sealed closed to form inflated pouches.

Further methods for making inflated pouches in accordance with the present invention are also possible. For example, FIGS. 6 and 7 disclose alternative methods 95 and 97, respectively, for making inflated pouches, wherein each comprises steps of:

a. providing an inflatable web, such as inflatable web 18 (FIG. 2) or 18" (FIG. 5);

b. folding the web along the longitudinal dimension 32 thereof to form a longitudinal fold 36 therein to configure web in the form of two juxtaposed panels 38a, b joined together at the longitudinal fold 36;

c. introducing gas into the inflatable chambers 26 in the web via the inflation ports 30;

d. sealing the inflation ports 30 to enclose the gas within the chambers 26; and e. producing a series of transverse seals 40' that bond the panels 38a, b together to form a series 96 of inflated pouches 12''' between pairs 40a', b' of the transverse seals 40'.

The step of providing the inflatable web (step a) may be effected by supplying a pre-configured inflatable web, e.g., such as web 18 as illustrated in and described with respect to FIG. 2, or supplying two separate webs or a single, folded web with juxtaposed sheets, which are sealed together in the form of an inflatable pattern, e.g., as illustrated in and described with respect to FIG. 5. Both of methods 95 and 97, as shown in respective FIGS. 6 and 7, employ pre-configured web 18.

Figure 6:
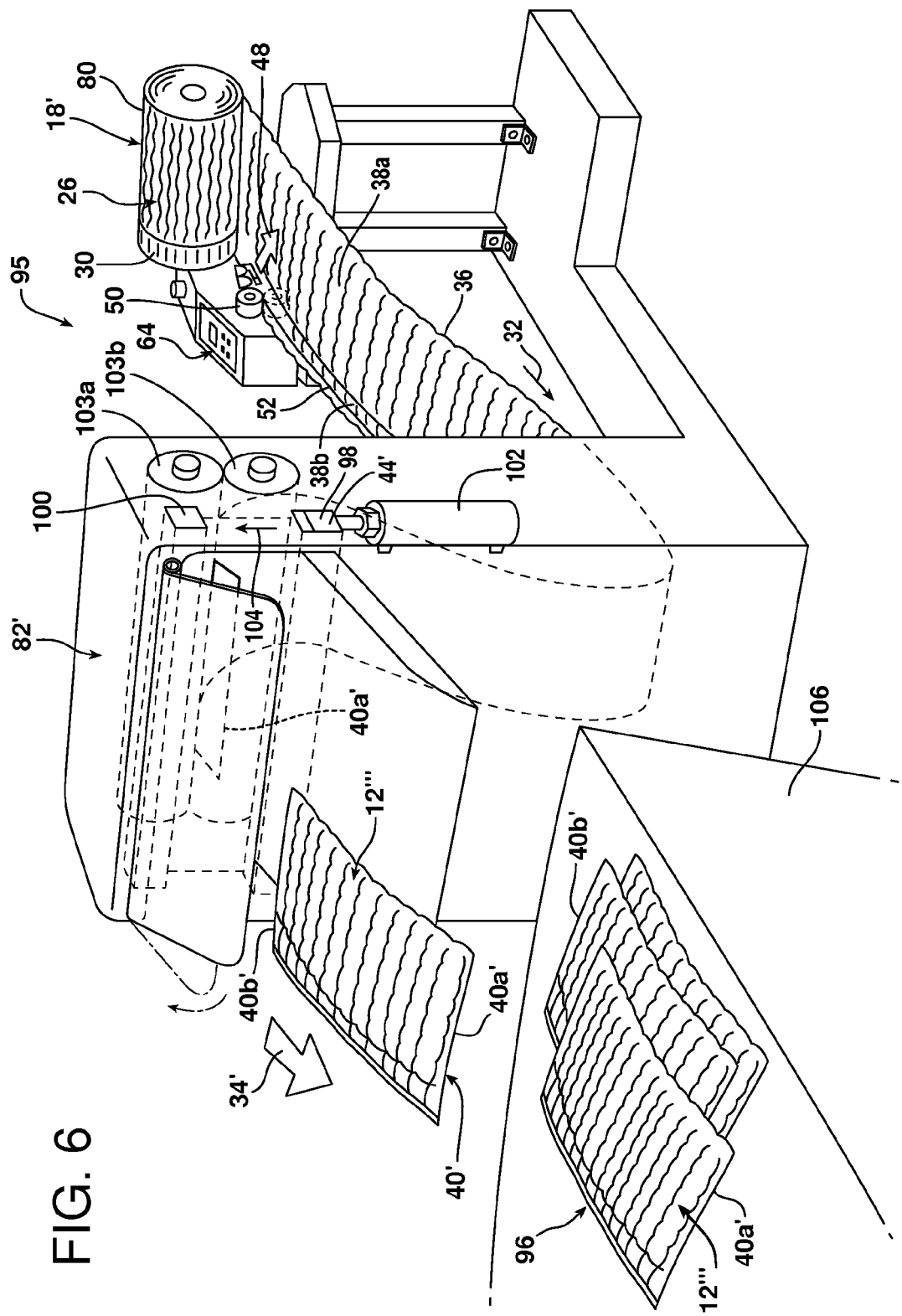
FIG. 6 is a perspective view of a further alternative system and method for making inflated pouches in accordance with the present invention.
Figure 7:
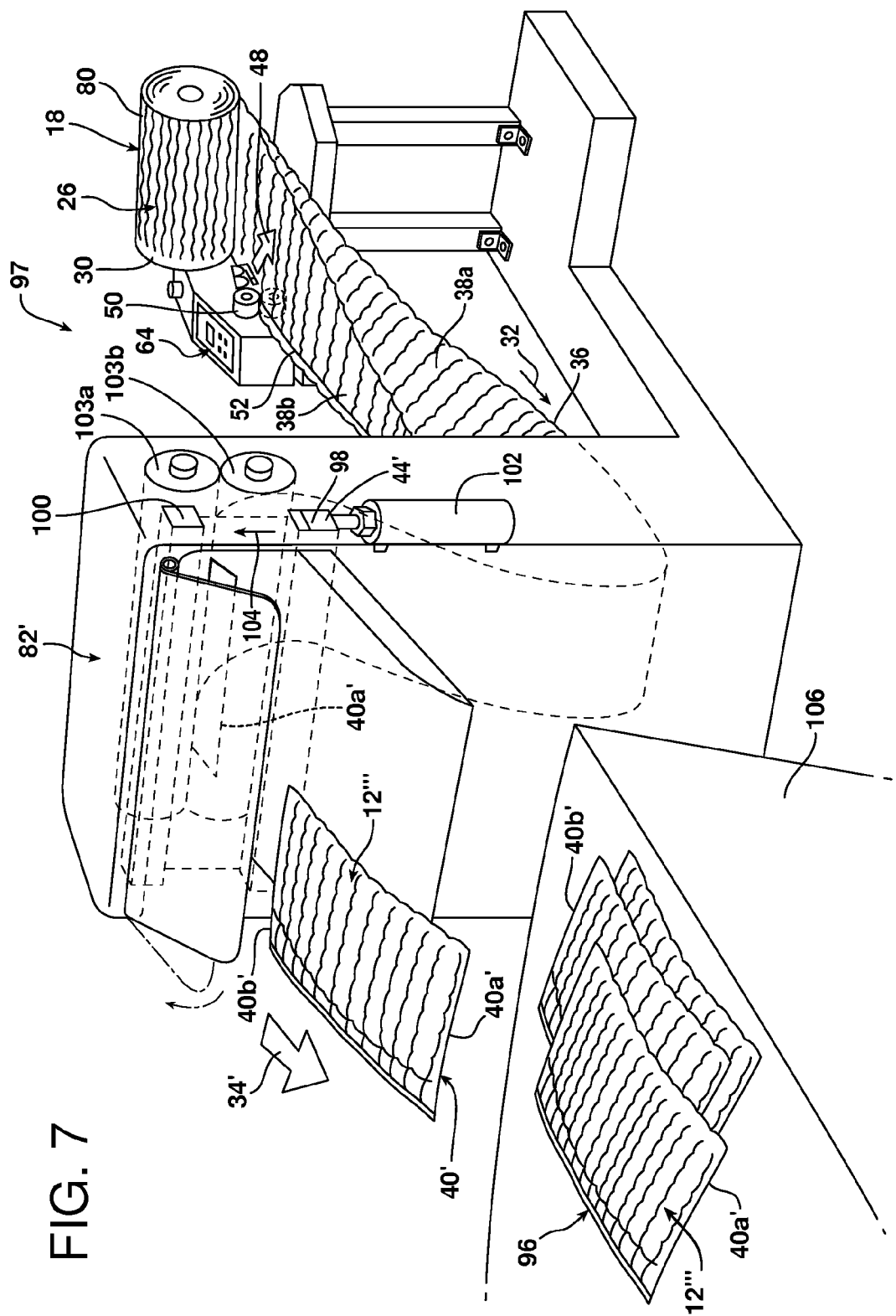
FIG. 7 is a perspective view of another alternative system and method for making inflated pouches in accordance with the present invention.

The step of folding the web (step b) may be accomplished by pre folding the web and storing it, e.g., as web 18' on supply roll 80 (FIG. 3), for subsequent deployment into the remainder of the process, as illustrated in method 95 (FIG. 6). Alternatively, web 18 may be folded as a continuous step in the process, as illustrated in method 97 (FIG. 7). Accordingly, although method 95 is a discontinuous process while method 97 is a continuous process, both methods yield the same result: the production of series 96 of inflated pouches 12'''.

Both the steps of introducing gas into the inflatable chambers 26 and sealing closed the inflation ports 30 (steps c and d) may be carried out with machine 64 as described above, or with any other of the described 'inflation and sealing' machines. Thus, following inflation of chambers 26 with gas 48, sealing mechanism 50 forms longitudinal heat seal 52 to close the inflation ports 30, and thereby completes the inflation and longitudinal sealing process for web 18' in method 95 (FIG. 6) and web 18 in method 97 (FIG. 7).

Note that the step of folding the web (step b) may occur prior to the steps of inflating the inflatable chambers and sealing closed the inflation ports (steps c and d), e.g., as in method 95 (FIG. 6). Alternatively, the step of folding the web (step b) may occur after the steps of inflating the inflatable chambers and sealing closed the inflation ports (steps c and d), e.g., as in method 97 (FIG. 7), wherein web 18 is first inflated and sealed by machine 64, then the inflated and sealed web is longitudinally folded.

Step e—producing a series of transverse seals 40' that bond the panels 38a, b together to form a series of inflated pouches 12''' between pairs 40a' and 40b' of the transverse seals—may be carried out by alternative transverse seal mechanism 44' in alternative transverse sealing station 82'. Unlike the rotary-type transverse seal mechanism 44, alternative seal mechanism 44' forms transverse seals 40' via linear translation of seal bar 98 against stationary backing bar 100, with the linear translation of seal bar 98 being provided by actuator 102, which may be embodied by a pneumatic, electric, or hydraulic piston-cylinder-pushrod device as shown. The alternative transverse sealing station 82' may further include a pair of drive rollers 103a, b to convey the inflated, juxtaposed panels 38a, b through the sealing station.

Transverse seal mechanism 44' forms transverse seals 40' in the inflated, juxtaposed panels 38a, b transversely of the direction 34' in which the panels are conveyed through sealing station 82'. Transverse seal mechanism 44' may be a 'double seal' type transverse sealing mechanism, which may include, e.g., on seal bar 98, a pair of transverse sealing elements, e.g., bands, wires, or other types of electrically-resistive elements (not shown). In this configuration, when seal bar 98 is moved by actuator 102 in the direction of arrow 104 towards the backing bar 100, a transverse segment of the inflated, juxtaposed panels 38a, b are compressed between the bars 98, 100, such that the sealing elements on the seal bar 98 are urged against the panels. When energized, e.g., by causing electricity to flow through the sealing elements, this compressive action causes one of the sealing elements to produce a trailing edge transverse seal 40b' for the just-completed pouch 12'' (shown as exiting the transverse sealing station 82'), and the other sealing element to produce a leading edge transverse seal 40a' on the next-to-be completed pouch (the leading edge of which is shown inside of transverse sealing station 82'). Further details regarding 'double seal' type transverse sealing mechanisms are disclosed in U.S. Pat. No. 5,942,076, the disclosure of which is hereby incorporated herein by reference thereto. As an alternative, a 'single seal' mechanism could be used, i.e., wherein seal bar 98 includes only one sealing element, such that only one transverse seal 40' is made during each actuation of the seal bar.

As described above in connection with transverse seal mechanism 44, the frequency at which the transverse seal mechanism 44' makes transverse seals may be independently controlled, i.e., independent of the speed at which the web 18/panels 38a, b is conveyed through sealing station 82' and selectively controlled, such that the width dimension of the completed pouches 12''' may be varied on a real-time, e.g., on-the-fly, basis.

Methods 95 and 97 may further include the step of separating the inflated pouches 12''' from the folded and inflated web 18 (which is in the form of inflated, juxtaposed panels 38a, b). This may be accomplished on an individual basis as illustrated in FIGS. 6 and 7, i.e., with each completed pouch 12''' individually and sequentially separated from the web to produce a series 96 of individual pouches, e.g., for collection/accumulation on/in a surface or container 106. To this end, transverse seal mechanism 44' may be structured and arranged to both sever and seal the web 18/panels 38a, b. Transverse seal mechanism 44' may thus further include a transverse severing element (not shown), which may be positioned on seal bar 98, e.g., between the sealing elements (when seal bar 98 is configured as a 'double seal' bar as described above), to transversely sever the web/panels in between the transverse seals formed by the transverse sealing elements. Such transverse severing element may be an electrically-resistive element, which severs web 18/panels 38a, b by heating to a temperature sufficient to melt through the web, e.g., as described in U.S. Pat. Nos. 5,376,219 and 6,003,288, the disclosures of which are hereby incorporated herein by reference thereto.

Alternatively, the severing element on seal bar 98 could be a cutting blade or the like to effect mechanical severance of the web 18/panels 38a, b. As a further alternative, a single sealing/severing element could be employed on seal bar 98, which both seals and severs the web/panels, e.g., as described in the '219 and '288 patents. As described more fully below, another alternative is to form transverse lines of weakness, i.e., perforation lines instead of a full-severance cuts, which would allow the completed pouches 12''' to be subsequently separated from the web/panels individually, in pairs, or in groups, either manually, e.g., with a device that facilitates manual separation, such as that which is disclosed in U.S. Publication 2012-0072016, the disclosure of which is hereby incorporated herein by reference thereto, or via an automated 'perf-tearing' device. As yet a further alternative, a severance mechanism may be provided that may be operated independently of the transverse sealing mechanism, such that completed pouches 12''' may be separated from the web/panels in pairs or in groups of 3 or more, as disclosed, e.g., in the above-incorporated U.S. Pat. No. 8,356,463.

As noted above, in accordance with some embodiments of the present invention, transverse fines of weakness may be formed between one or more competed, inflated pouches to allow them to be separated at a desired time and in desired groupings, i.e., individually, in pairs or in groups. For example, with reference back to FIGS. 1 and 3, the supply 14 of inflatable pouches 16 may include at least one fine of weakness 108 between at least one pair of transverse seals 40a, b. As illustrated, the lines of weakness 108 are positioned between each pair of transverse seals 40a, b. This may be accomplished in accordance with the above-incorporated U.S. Pat. No. 7,389,626, by including a perforation blade 110 in the transverse seal mechanism 44, positioned between the transverse seal members 86a, b, such that a fine of weakness 108 is formed each time that a pair of transverse seals 40a, b is formed, and is disposed therebetween as shown. Alternatively, an independently-controllable and actuatable perforation mechanism could be used, as disclosed in the above-incorporated U.S. Pat. No. 8,356,463, so that lines of weakness 108 may be placed at any desired location, e.g., between every other pair of transverse seals 40a, b, between every third pair, etc. Another example of an independent perforation mechanism is shown in FIG. 5, wherein rotary perforation mechanism 112 is illustrated. As shown, rotary perforation mechanism 112 is independent of transverse seal mechanism 44, i.e., is both physically and operationally separate therefrom.

A perforation blade, such as blade 110, could be employed in processes 95 and/or 97 (FIGS. 6 and 7), e.g., on seal bar 98 of transverse seal mechanism 44', and could similarly either be fixed in place to make a line of weakness during every actuation of the seal bar, or could be independently-controllable and actuatable as per the '463 patent.

If desired, the connected series of inflated pouches 12' (from system 10—FIG. 1) or 12'' (from system 10'—FIG. 5) may be sent to, and accumulated on, a winding/storage device, such as that which is described in U.S. Publication No. 2012-0273602, the disclosure of which is hereby incorporated herein by reference 3C) thereto. Alternatively, the inflated pouches, including pouches 12''', may be directed individually, in pairs, or in groups of three or more to an accumulation bin.

After inflated pouches, e.g., 12', 12'', or 12''', have been produced in accordance with the present invention, the further step of making a package from one or more of the inflated pouches may be carried out, which will generally comprise at least one of (a) placing an object to be packaged within one or more of the inflated pouches and/or (b) placing one or more of the inflated pouches over a portion of an object to be packaged. Examples of the former packaging method are illustrated in FIGS. 8-11 while an example of the latter packaging method is illustrated in FIG. 12.

Figure 8:
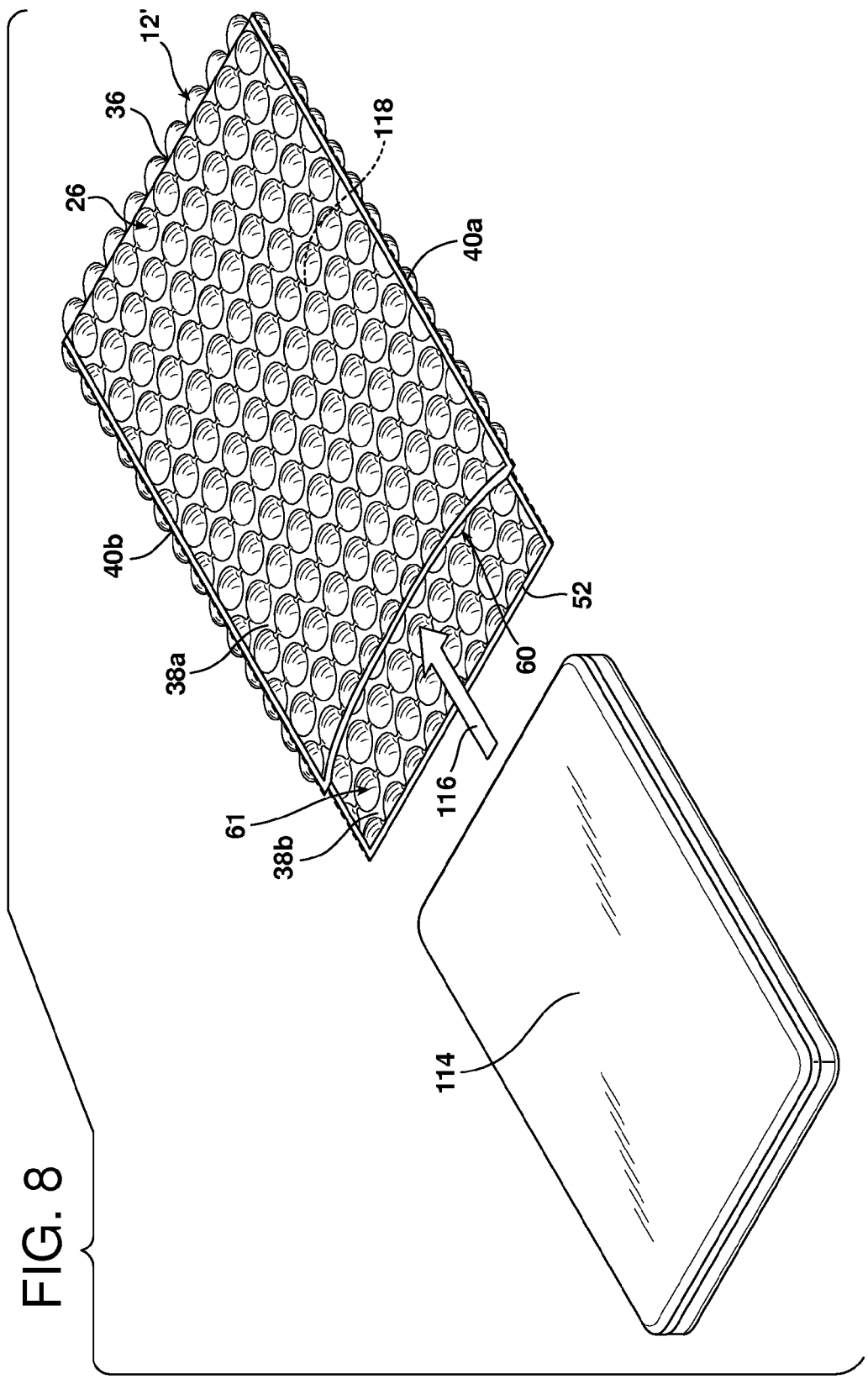
FIG. 8 is a perspective view of a packaging application for an inflated pouch made by the system and method illustrated in FIG. 1.

FIGS. 8-10 show a completed, inflated pouch 12', as produced by process/system 10 (FIG. 1), being used to package an object 114 by placing the object with the inflated pouch 12', wherein the pouch is in the form of an already-inflated inflatable mailer. Thus, as shown in FIG. 8, object 114 to be packaged, e.g., a laptop computer or the like, may be moved in the direction of arrow 116, through the open top 60, and into the interior 118 of the pouch 12', to assume the enclosed position shown in FIG. 9. Extended region 61 may then be folded over the open top 60 as shown in FIG. 9, i.e., moved in the direction of arrow 120, to enclose the object 114 within the interior 118 of pouch 12'. The extended region 61 may then be secured to the 'front' panel 38*a*, e.g., via adhesive tape, glue, or the like (not shown), to seal object 114 within the pouch 12'. The resultant final package 122 is shown in FIG. 10, and is ready for shipment to the intended destination for object 114.

Figure 11A:
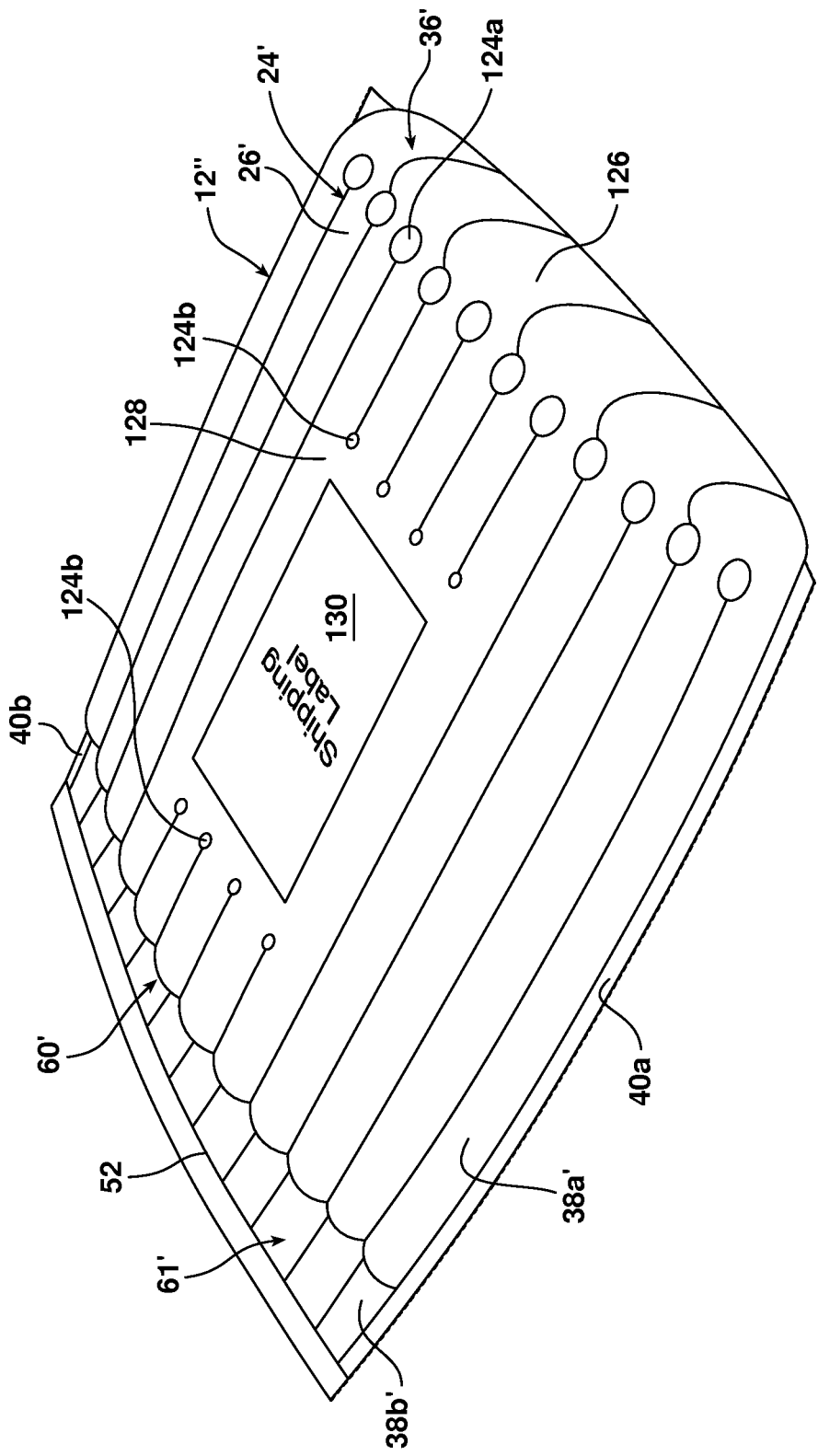
FIGS. 11A-C are perspective views of packaging applications for an inflated pouch made by the system and method illustrated in FIG. 5.
Figure 11B:
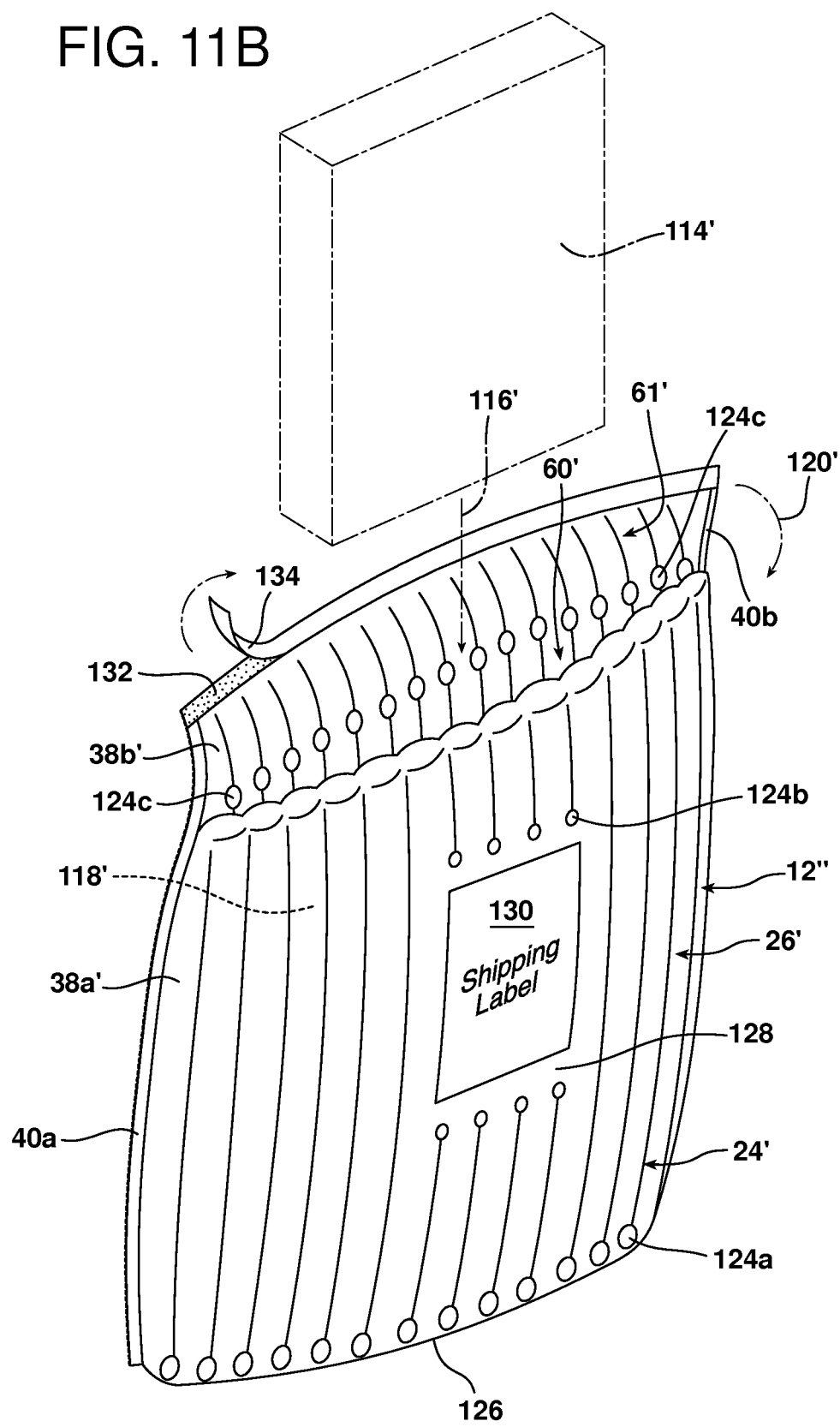
Figure 11C:
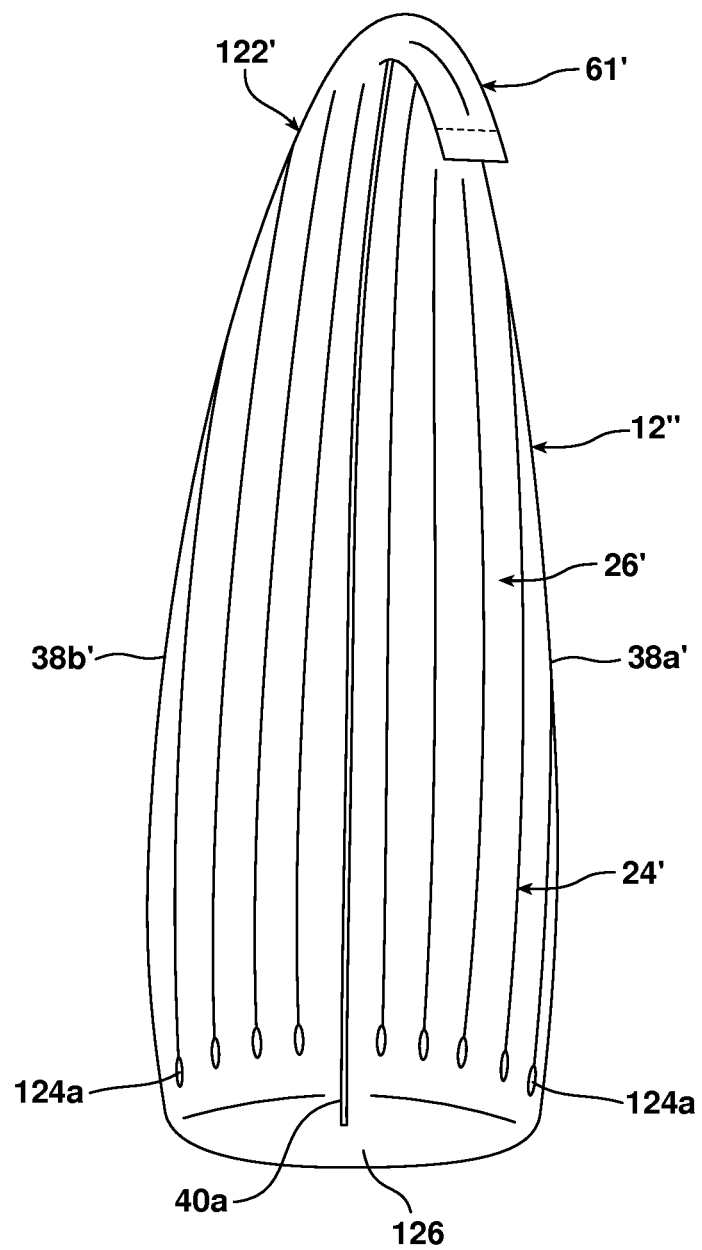
Figure 12:
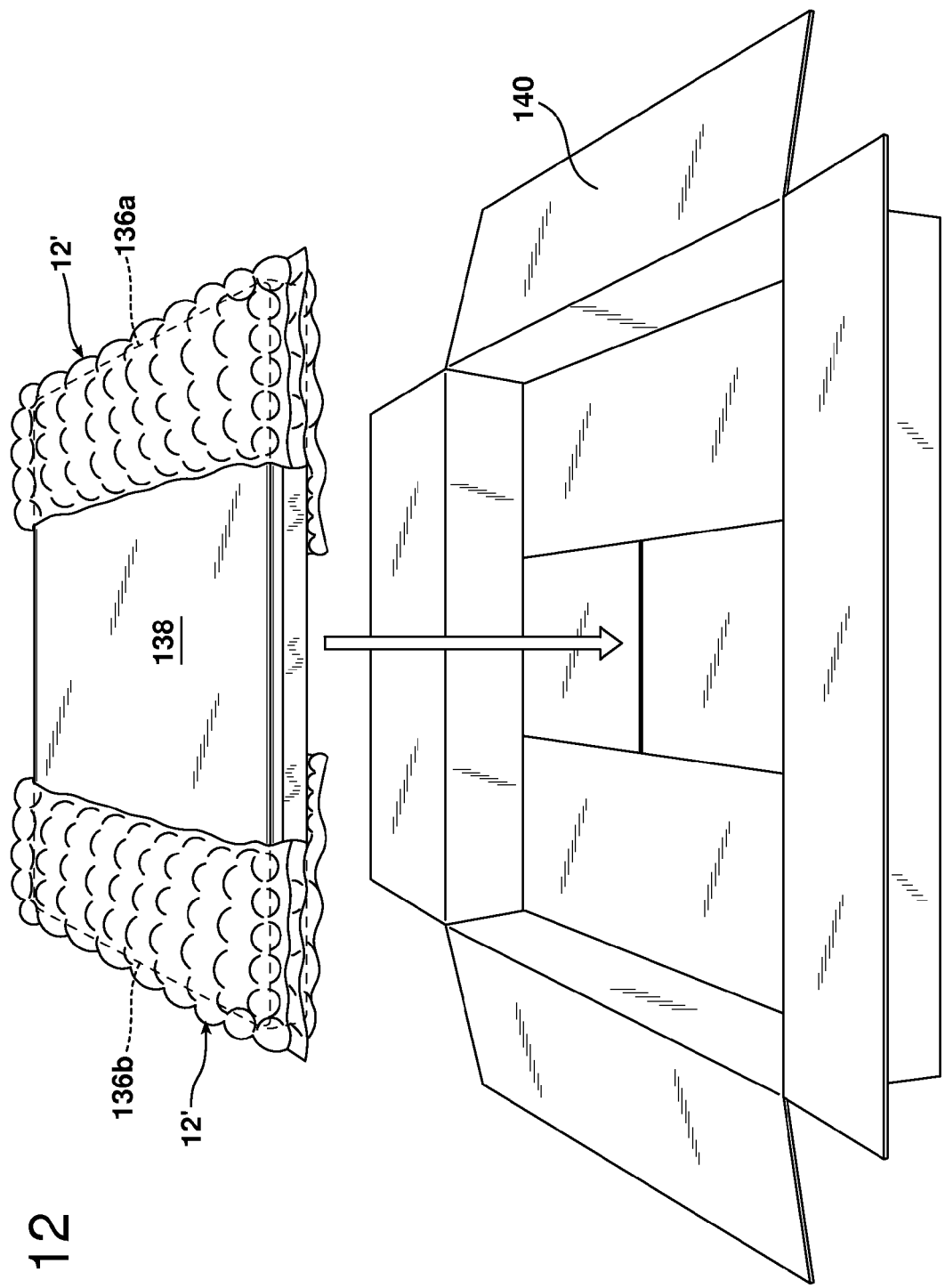
FIG. 12 is a perspective view of a packaging arrangement in accordance with an alternative embodiment of the invention.

Alternative inflated pouch 12'', as made by the system/process 10' illustrated in FIG. 5, is shown in FIGS. 11A-11C. Like inflated pouch 12', inflated pouch 12'' is in the form of an inflated mailer, and similarly includes juxtaposed panels 38*a'* and 38*b'* joined at longitudinal fold 36', sides formed by transverse seals 40*a, b*, an open top 60', and an extended section 61'. Thus, an object 114' to be packaged may be moved in the direction of arrow 116', through the open top 60', and into the interior 118' of the pouch 12''. Extended region 61' may then be folded over the open top 60' as shown by moving it in the direction of arrow 120', to thereby enclose the object 114' within the interior 118' of pouch 12''. The extended region 61' may then be secured to the 'front' panel 38*a'* as shown in FIG. 11C, to seal object 114' within the pouch 12''. The resultant final package 122' (FIG. 11C) is then ready for shipment to the intended destination for object 114'.

In this embodiment, the inflatable chambers 26' in pouches 12'' are substantially linear, e.g., tube-shaped vs. the chambers 26 in pouches 12', which are non-linear, e.g., connected-bubble-shaped. Further, the seal pattern 24' in the inflatable web 18'' is configured such that that the resultant inflatable pouches 16' (FIG. 5) are capable of being free-standing, once they are inflated and sealed to become inflated pouches 12'' (FIGS. 11A-11C). This may be accomplished, e.g., as shown, wherein seal pattern 24' includes land areas 124*a* positioned near, e.g., on either side of, longitudinal fold 36' to produce a relatively flat bottom 126 on the resultant inflated pouch 12''. As perhaps shown most clearly in FIG. 11C, the flat bottom 126 allows the inflated pouch 12'' to assume a free-standing, upright position.

FIGS. 11A-C show another optional feature of the invention, whereby inflated pouch 12'' includes an outer surface 128 adapted to receive thereon a label 130. Such outer surface 128 may be an area of sufficient planarity and/or sufficiently free of surface irregularities, i.e., of sufficient smoothness, to allow a label 130, e.g., a shipping label, to be affixed, e.g., adhesively affixed, to such surface 128. Examples include a flat outer panel affixed to one or both inflatable panels 38*a, b*; an outer bag in which the inflatable pouches 16 or 16' are contained; or, as illustrated, a relatively smooth area in panel 38*a'* as created by seal pattern 24', e.g., as defined by a plurality of land areas 124*b*, between which the relatively flat outer surface 128 is thereby formed.

FIG. 11B illustrates a further optional feature of the invention, whereby an adhesive strip 132 is included, e.g., on extended region 61', in order to facilitate securing the extended region 61' to the front panel 38*a'* as shown in FIG. 11C, to thereby complete the package 122'. A removable cover strip 134, e.g., a release liner, may be included over the adhesive strip 132 to provide protection thereto until it is desired to adhere the extended region 61' to panel 38*a'*, at which time the cover strip 134 may be removed from the adhesive strip 132 as shown. Folding of the extended region 61', which will be inflated in many embodiments, in order to secure it to front panel 38*a'*, may be facilitated by including a series of land areas 124*c* (FIG. 11B) in panel 38*b'*, e.g., in a linear pattern as shown to define a fold fine, which may be positioned at the line of departure from which extended region 61' begins.

In the foregoing embodiments, the inflated pouches 12' and 12'' are of sufficient size that the object to be packaged (114, 114') may be entirely enclosed within such pouches. In an alternative embodiment, the pouches may be sized such that they fit over only a portion of the object to be packaged, e.g., an end portion of the object such that the pouch would be in the form of an 'end-cap.' In this case, the associated packaging method includes placing one or more of the inflated pouches over a portion of an object to be packaged. This type of packaging arrangement is illustrated in FIG. 12, wherein a pair of pouches 12' have been placed over two ends 136*a, b* of an object 138 to be packaged, e.g., a satellite TV receiver, such that the two pouches 12' arranged in this manner may be said to form a pair of 'end-caps.' The resultant combination is thus ready for placement in shipping carton 140, wherein the pouches/end-caps 12' will provide cushioning protection to the object 138 inside of the shipping carton 140 during transit.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention.

What is claimed is:

1. A supply of inflatable pouches, the supply comprising:
   an inflatable web, the web comprising two sheets having inner surfaces sealed to each other in a pattern defining a series of inflatable chambers each having a closed distal end and an open proximal end, the open proximal end providing an inflation port for each of the chambers, the chambers arrayed in a substantially transverse orientation to a longitudinal dimension of the web, wherein:
     the inflatable web includes a longitudinal inflation edge and an opposing closed longitudinal edge,
     the inflation ports of the chambers are positioned in series along the inflation edge; and
     the closed distal ends of the chambers are positioned in series along the closed edge,
   a longitudinal fold in the web, which extends along the longitudinal dimension thereof such that the web is configured in the form of two juxtaposed inflatable panels joined together at the longitudinal fold, wherein the longitudinal fold in the inflatable web is off-center so that the inflation edge is off-set from the closed edge in the supply of inflatable pouches, and a series of transverse seals that bond the panels together to form a connected series of inflatable pouches between pairs of the transverse seals such that the connected series of inflatable pouches extends along the longitudinal dimension of the web.

2. The supply of claim 1, wherein the inflation edge and the closed edge extend from the longitudinal fold;

the inflation edge extends from the longitudinal fold by a greater distance than does the closed edge; and the greater distance corresponds to the off-set between the inflation edge and the closed edge.

3. The supply of claim 2, wherein the supply of inflatable pouches is configured to be used in a system that includes a conveyance mechanism for conveying the supply of inflatable pouches through the system, wherein the conveyance mechanism is configured to engage the inflation edge to effect conveyance.

4. The supply of claim 3, wherein the conveyance mechanism is configured to effect the conveyance of the supply of inflatable pouches in a direction that is parallel to the longitudinal dimension of the web.

5. The supply of claim 4, wherein the conveyance mechanism is configured to effect the conveyance in a substantially continuous manner.

6. The supply of claim 5, wherein the system further includes an inflation assembly configured to introduce gas into the inflatable chambers via the inflation assembly configured to introduce gas into the inflatable chambers via the inflation ports to thereby inflate the juxtaposed inflatable panels of the inflatable pouches so as to form inflated pouches, and wherein the inflation assembly is configured to introduce gas into the inflatable chambers substantially continuously and sequentially via the inflation ports.

7. The supply of claim 5, wherein the system further includes a sealing mechanism configured to seal the inflation ports to enclose gas within the chambers of the inflated pouches, and wherein the sealing mechanism is configured to seal the inflation ports substantially continuously and sequentially.

8. The supply of claim 2, wherein the inflatable web includes a pair of longitudinal flanges formed by a portion of each of the sheets that extend beyond the inflation ports to define the inflation edge.

9. The supply of claim 1, wherein each of the inflatable chambers has a predetermined length; and each of the chambers has at least one change in width over its length.

10. The supply of claim 1, wherein the supply of inflatable pouches further includes at least one line of weakness between at least one pair of the transverse seals.

11. The supply of claim 1, wherein the seal pattern in the inflatable web is configured such that the inflatable pouches are capable of being free-standing when inflated.

12. The supply of claim 6, wherein the inflated pouches include an outer surface adapted to receive thereon a label.

* * * * *